US011783084B2

(12) United States Patent
Joshi et al.

(10) Patent No.: US 11,783,084 B2
(45) Date of Patent: Oct. 10, 2023

(54) SAMPLING OF TELEMETRY EVENTS TO CONTROL EVENT VOLUME COST AND ADDRESS PRIVACY VULNERABILITY

(71) Applicant: Microsoft Technology Licensing, LLC, Redmond, WA (US)

(72) Inventors: Dhruv Joshi, Bellevue, WA (US); Ajanta Mahato, Snoqualmie, WA (US); Dolly Sobhani, Seattle, WA (US); Brian Eugene Kihneman, Bellevue, WA (US); Siddharth Dahiya, Kenmore, WA (US); Heron Arzaquel Anzures Reyes, Bellevue, WA (US); Matthew Joseph Koscumb, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 17/351,874

(22) Filed: Jun. 18, 2021

(65) Prior Publication Data

US 2022/0405419 A1 Dec. 22, 2022

(51) Int. Cl.
*G06F 21/62* (2013.01)
*H04L 9/06* (2006.01)
*H04L 67/12* (2022.01)

(52) U.S. Cl.
CPC ........ *G06F 21/6245* (2013.01); *H04L 9/0643* (2013.01); *H04L 67/12* (2013.01)

(58) Field of Classification Search
CPC .... G06F 21/6245; H04L 9/0643; H04L 67/12
See application file for complete search history.

(56) References Cited

U.S. PATENT DOCUMENTS

| 10,574,840 | B1 | 2/2020 | Sabandith |
| 2016/0224461 | A1* | 8/2016 | Araya ................. G06F 11/3644 |
| 2019/0147188 | A1 | 5/2019 | Benaloh et al. |
| 2019/0354717 | A1 | 11/2019 | Boon et al. |
| 2020/0204468 | A1 | 6/2020 | Nickolov et al. |
| 2021/0232472 | A1* | 7/2021 | Nagaraj ............. H04L 43/0876 |

OTHER PUBLICATIONS

"International Search Report and Written Opinion Issued in PCT Application No. PCT/US22/028890", dated Aug. 2, 2022, 12 Pages.

* cited by examiner

*Primary Examiner* — Mohammed Waliullah
(74) *Attorney, Agent, or Firm* — NovoTechIP International PLLC

(57) ABSTRACT

A system and method for sampling telemetry events are provided. The method includes receiving, by a cloud-based server, a plurality of telemetry events, related to an application, from a plurality of client devices; generating, by the cloud-based server, a sampling model for collecting a telemetry event based on the plurality of telemetry events, where the sampling model defines under what conditions the telemetry event is to be reported by a client device; generating, by the cloud-based server, an instruction for determining whether or not to report an incoming same telemetry event by the client device based on the sampling model; and providing, by the cloud-based server, the instruction to the client device, to allow the client device to determine whether or not to report the incoming same telemetry event based on the instruction.

20 Claims, 7 Drawing Sheets

SAMPLING OF TELEMETRY EVENTS TO CONTROL EVENT VOLUME COST AND ADDRESS PRIVACY VULNERABILITY

BACKGROUND

Telemetry events (a.k.a. diagnostic data events) are system data that is emitted from a software application (e.g., Windows 10®) at runtime when a particular point of code has executed. For example, when opening a file in the Microsoft Word® application, a "file open" telemetry event may be emitted. In the software industry, there is a trend to collect and analyze telemetry event data as a part of a shift to data-driven problem solving and decision making, where the software industry includes not just Microsoft® and Google® but also companies like Tesla Motors®. For example, if Microsoft Word® crashed when opening a file, telemetry data, such as the name of the app (e.g., Microsoft Word®), the version of the app, the exception code returned by a process that has crashed, etc., may be then emitted, providing developers necessary information about the failure of the file open. For another example, Tesla Motors® may use vehicle telemetry data to provide ongoing product improvements to its cars. For each application, there are many different types of telemetry events that may be reported, such as how many times users click an application, how much time takes an application to start, how many people use some feature, etc., all of which may provide some information for understanding the operation of an application. While diagnostic events included in telemetry data are helpful in data-driven problem solving and decision making, as the number of customers (e.g., hundreds of millions of uses for Microsoft Word®) increase and the number of telemetry events increase in an application, the processing cost associated with these events increases, which can impact the bottom line of the management of telemetry events in the backend. In addition, the marginal cost increase is not always favorable when compared to the return-on-investment (ROI) of the marginal data insights increase, since there is a per-event fixed processing cost in telemetry event collection and analysis.

Additionally, private information leakage has been a major concern for customers in telemetry event data reporting. When collecting telemetry event data, some applications may inform customers what will be collected and what will not be collected, or ask users permission to opt-in/out of certain types of telemetry events, and thus sensitive data is generally not collected in telemetry event data. However, certain bugs may also cause sensitive data to be included unexpectedly in collected telemetry events since some bugs may cause code not to behave per the intent of the developer.

Therefore, there is a need to control the processing cost for rising volume of telemetry events to maximize ROI and mitigate privacy vulnerability of certain telemetry data in applications.

SUMMARY

In one aspect, a system for sampling telemetry events includes a processor, and a memory, coupled to the processor, configured to store executable instructions. The instructions, when executed by the processor, cause the processor to receive a plurality of telemetry events, related to an application, from a plurality of client devices; generate a sampling model for collecting a telemetry event based on the plurality of telemetry events, where the sampling model defines under what conditions the telemetry event is to be reported by a client device; generate an instruction for determining whether or not to report an incoming same telemetry event by the client device based on the sampling model; and provide the instruction to the client device, to allow the client device to determine whether or not to report the incoming same telemetry event based on the instruction.

In another aspect, a method for sampling telemetry events includes receiving, by a cloud-based server, a plurality of telemetry events, related to an application, from a plurality of client devices; generating, by the cloud-based server, a sampling model for collecting a telemetry event based on the plurality of telemetry events, where the sampling model defines under what conditions the telemetry event is to be reported by a client device; generating, by the cloud-based server, an instruction for determining whether or not to report an incoming same telemetry event by the client device based on the sampling model; and providing, by the cloud-based server, the instruction to the client device, to allow the client device to determine whether or not to report the incoming same telemetry event based on the instruction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
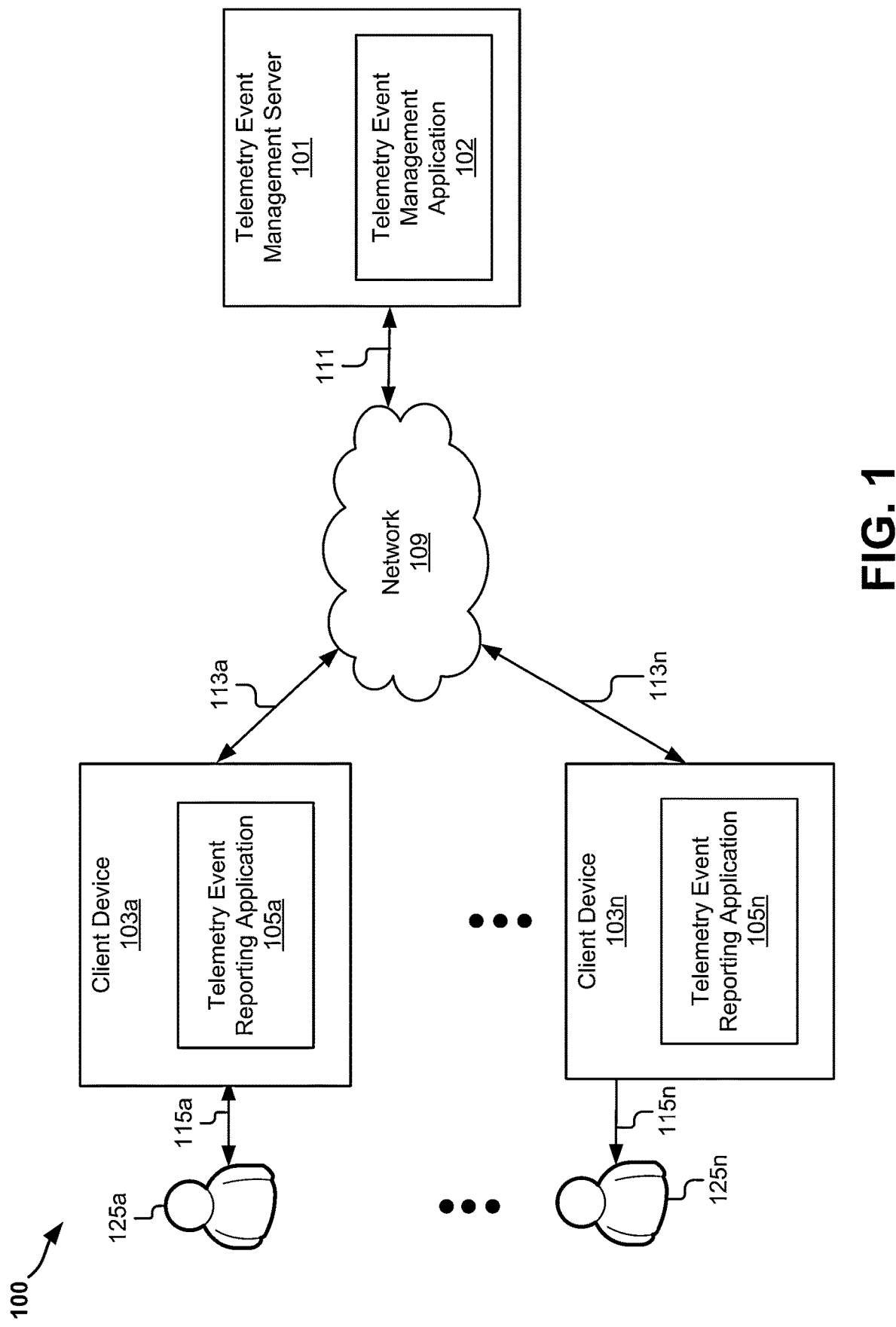
FIG. 1 is a block diagram illustrating an example telemetry event management system.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The present disclosure provides technical solutions to address technical problems associated with the existing telemetry event reporting processes. Briefly, the technical solutions described in the present disclosure address the technical problem of processing cost associated with a large volume of telemetry events collected for an application as the number of customers associated with the application increase and the number of telemetry events increases in running the application. The technical solutions include collecting telemetry events from a random sample of users with a statistical significance instead of from all users, aggregating telemetry events locally on client devices instead of collecting a separate telemetry event for each instance of the event, and the like. In some embodiments, the technical solutions may further include creating client-version models on client side, which may be used by the clients to preferentially collect events that are anomalous to what a model has already seen, thereby adding new information to the model and helping refine the model used in monitoring telemetry events reporting. These various measures may greatly reduce the telemetry events to be collected for an application, thereby reducing the processing cost associated with the telemetry event management.

The technical solutions described in the disclosure also address the technical problems of the privacy vulnerability when telemetry events contain sensitive data, e.g., when there is a bug that causes unexpected sensitive data to be included in the telemetry events. The described technical solutions include turning off the relevant telemetry events and/or replacing the sensitive data with a hash value, where the sensitive data may be hashed using a "salt" only available in a client boundary so that the sensitive data cannot be decoded after leaving the client boundary. Alternatively, the sensitive data may be transmitted through a pipeline that supports a high level of data sensitivity, so that the obligations to customer privacy can be met without necessarily discarding the telemetry data that may result in data quality issues and loss of data. These various measures may address the concerns of customer privacy and/or prevent personal and confidential information from being stolen by scammers and fraudsters, while still allowing certain insights to be obtained from these sensitive data-containing telemetry events.

The features and advantages described herein are not all-inclusive and many additional features and advantages will be apparent to one of ordinary skill in the art in view of the figures and the following descriptions.

FIG. 1 is a block diagram of an example telemetry event management system 100. As illustrated, the system 100 includes one or more client devices 103a . . . 103n and one or more users 125a . . . 125n coupled to the client devices 103a . . . 103n via signal lines 115a . . . 115n. Optionally, the telemetry event management system 100 may further include a telemetry event management server 101 communicatively coupled to the one or more client devices 103a . . . 103n via a network 109 and a signal line 111. Each of the client devices 103a . . . 103n may further include a telemetry event reporting application 105n. Optionally, a telemetry event management application 102 may also be included in the telemetry event management server 101. It is to be noted that FIG. 1 is provided by way of example and the system 100 and/or further systems contemplated by the present disclosure may include additional and/or fewer components, may combine components and/or divide one or more of the components into additional components, etc. For example, the system 100 may include any number of telemetry event management servers 101, client devices 103a . . . 103n, or networks 109.

The network 109 may be a conventional type, wired and/or wireless, and may have numerous different configurations, including a star configuration, token ring configuration, or other configurations. For example, the network 109 may include one or more local area networks (LAN), wide area networks (WAN) (e.g., the Internet), public networks, private networks, virtual networks, mesh networks, peer-to-peer networks, and/or other interconnected data paths across which multiple devices may communicate. The network 109 may also be coupled to or include portions of a telecommunications network for sending data in a variety of different communication protocols. In some embodiments, the network 109 includes Bluetooth® communication networks or a cellular communications network for sending and receiving data including via short messaging service (SMS), multimedia messaging service (MMS), hypertext transfer protocol (HTTP), direct data connection, WAP, email, etc.

The client devices 103a . . . 103n (or collectively client device 103) may include virtual or physical computer processors 103, memor(ies), communication interface(s)/device(s), etc., which along with other components of the client device 103 are coupled to the network 109 via signal lines 113a . . . 113n for communication with other entities of the system 100. In some embodiments, the client device 103a . . . 103n, accessed by users 125a . . . 125n, may send and receive data to and from other client device(s) 103 and/or the telemetry event management server 101, and may further analyze and process the data. For example, the client devices 103a . . . 103n may communicate with the telemetry event management server 101 to transmit telemetry event data to the telemetry event management server 101. The telemetry event management server 101 may analyze telemetry events to determine whether there are already enough telemetry events that have been collected for obtaining a statistically significant insight. The telemetry event management server 101 may inform the client devices 103 not to send additional telemetry events if there are enough telemetry events collected. Non-limiting examples of client device 103 may include a laptop computer, a desktop computer, a tablet computer, a mobile telephone, a personal digital assistant (PDA), a mobile email device, or any other electronic devices capable of invoking telemetry events.

In some embodiments, the client devices 103a . . . 103n may include instances 105a . . . 105n of a telemetry event reporting application 105. The telemetry event reporting application 105 may detect one or more telemetry events for an application running on a client device 103. Instead of directly forwarding a detected telemetry event to the telemetry event management server 101, the telemetry event reporting application 105 may determine whether to forward a detected telemetry event to the telemetry event management server 101 based on certain information (e.g., models, instructions) received from the telemetry event management server 101 or based on certain other criteria. If it is determined to forward the detected telemetry event, the telemetry event reporting application 105 may upload the detected telemetry event to the telemetry event management server 101. However, if it is determined that the detected telemetry data is not needed to be forwarded to the telemetry event management server 101, the detected telemetry event may be discarded and will not be forwarded to the telemetry event management server 101.

In some embodiments, the telemetry event reporting application 105 may perform certain privacy protection for customers associated with the client devices. For example, if there is unexpected sensitive data (e.g., due to a bug) logged into a telemetry event, a corresponding client device 103n may receive a ping from the telemetry event management server 101 if the sensitive data is detected by the telemetry event management server 101. After the pinging process, the telemetry event management server 101 may provide instructions to the pinged client device 103n to exploit certain strategies to prevent the sensitive data from being reported, or instruct the pinged client device 103n to report the telemetry events containing the sensitive data through a different pipeline (e.g., through a pipeline with a higher level of security). The telemetry event reporting application 105 will be described in more detail below with reference to FIGS. 3A-3B.

As depicted, the telemetry event management server 101 may also include a telemetry event management application 102. In some embodiments, the telemetry event management server 101 may be a cloud-based server that possesses more data resources and also larger computing capabilities than the client devices 103, and therefore may perform more data analysis and complex computation than the client devices 103 can. For example, the telemetry event management application 102 may perform an analysis for a telemetry event based on the telemetry events received from different client devices 103, and determine whether a statistically significant insight can be obtained from the collected telemetry events. Such statistically significant insight may include, but are not limited to, button B is used more often by users than button A, it takes an application 5.5 seconds to start, 90% of users do not use feature A of an application, etc. If more telemetry events are necessary for determining a statistically significant insight, the telemetry event management application 102 may instruct the respective client devices 103 to report more telemetry events. However, if there is already a statistically significant insight obtained based on the collected telemetry events, the telemetry event management server 101 may instruct the client devices 103 not to report the same telemetry event. Responsive to the instructions from the telemetry event management server 101, the client devices 103 may therefore discard an incoming same telemetry event instead of reporting the telemetry event. In this way, the processing cost associated with each specific telemetry event may become smaller and smaller, so that less and less burden may be placed on the telemetry event management server 101.

In some embodiments, the telemetry event management application 102 may also detect unexpected sensitive data logged into the telemetry events and reported by the client devices 103. In response, the telemetry event management application 102 may ping a client device 103n that has reported the sensitive data, and instruct the corresponding client device 103n not to report the sensitive data or change a pipeline with higher-level security to report the telemetry event(s) containing the sensitive data. In some embodiments, the telemetry event management application 102 may ping all client devices and instruct the client devices not to report the sensitive data or change a pipeline with higher-level security to report the telemetry event(s) containing the sensitive data if the client devices ever see any instance of event with a known privacy issue, proactively rather than reactively. The telemetry event management application 102 will be described in more detail below with reference to FIG. 2.

Figure 2:
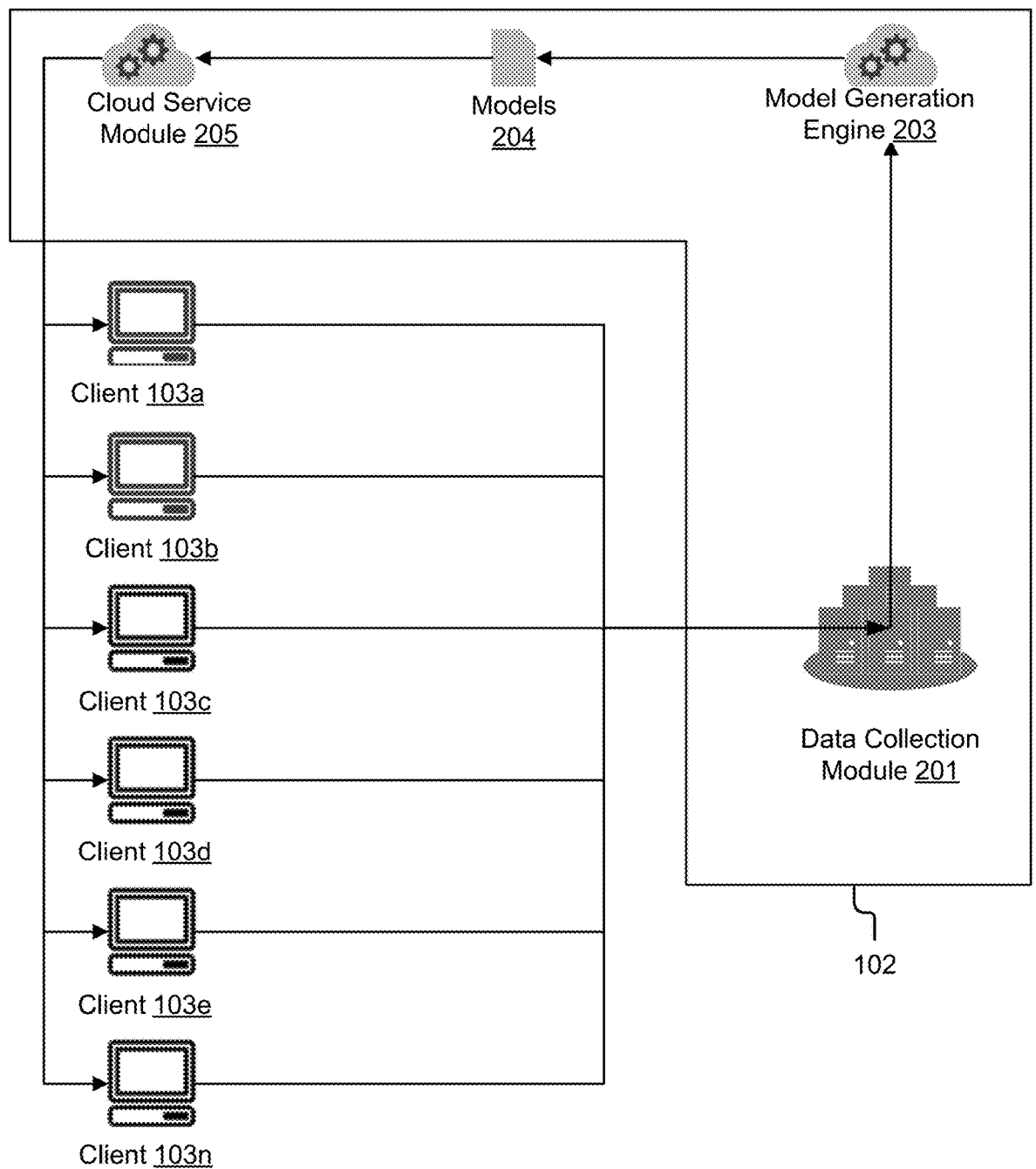
FIG. 2 is a schematic diagram illustrating an example process for managing telemetry event reporting for a plurality of client devices.

FIG. 2 is a schematic diagram of an example process for managing telemetry event reporting for a plurality of client devices 103. The example process may be implemented by the telemetry event management application 102 coupled to the plurality of client devices 103. As illustrated, the telemetry event management application 102 may include a data collection module 201, a model generation engine 203, and a cloud service module 205.

Data collection module 201 may receive a plurality of telemetry events reported by a plurality of client devices 103. The plurality of telemetry events may be associated with a same or different application. In addition, the plurality of events may be a same telemetry event reported from a same client device 103n at different times and/or from different client devices 103, or may be different telemetry events reported from a same or different client device 103. In some embodiments, instead of receiving each specific telemetry event, the data collection module 201 may also receive certain insight aggregated from each instance of activity on a client device 103n. For example, the number of times a user clicks button A may be aggregated on a client device 103n and sent to the data collection module 201 one event per day/week. This reduces the event volume processed by the telemetry event management system 100 while providing the same insight.

In some embodiments, the data collection module 201 may also collect certain other information related to a telemetry event reported from a client device 103n. For example, the data collection module 201 may also collect the IP address of the client device 103n, the location of the device, the device type, the build version of the application, the time to perform an action related to the telemetry event, and other cohort information that may help build insight for the telemetry event(s) associated with an application. In some embodiments, each event-reporting data may contain an event timestamp and other metadata associated with the reported telemetry event. In some embodiments, the collected telemetry events and/or information related to the telemetry events may be forwarded to the model generation engine 203 for generating one or more models for managing the telemetry event reporting.

Model generation engine 203 may generate one or more models 204 (which may be also referred to as "sampling models") that can be used to instruct the client devices to report telemetry events. A scenario-based sampling is briefly described here first. For example, for insight about how changing a specific font (e.g., changing font size) impacts a word document, an application may only want to collect the telemetry events when the users select the specific font, e.g., when a user aligns text justified through changing the font size. When those conditions are met, some telemetry data helping understand how changing a specific font (e.g., changing font size) impacts a word document may be then collected. A model that defines different steps or different conditions that need to be met may be created. For instance, a such generated model may inform the cloud service module 205 that 20 data points may need to be collected from each region, such as North America, South America, East Asia, South Asia, Mid East, and so on. It is to be noted that the region is used here merely for illustrative purposes. In actual applications, any dimension of collection may be used, such as gender, location, ethnicity, software type, operating system, etc. This approach to collection may help prevent creating machine learning models which are biased towards a few dimensions. The model generation engine 203 will be described more in detail below.

Model generation engine 203 may generate one or more models based on the telemetry events and/or insights collected from the plurality of client devices 103. More specifically, the one or more models 204 may be generated based on data mining the collected telemetry events and/or insights. For example, based on the collected telemetry events and/or insights, the model generation engine 203 may determine what kind of telemetry data may be necessary to provide a statistically significant insight for the telemetry events, e.g., how many times a telemetry event should be collected, how much percent of the telemetry events should be reported by the plurality of client devices 103, which region is getting more reported telemetry events, how many events should be collected from each region, which build is getting more reported telemetry events, how many events should be collected from each build, how often the telemetry events should be collected, and so on. In some embodiments, there may be many different models 204 that can be built based on the collected telemetry events and/or insights. In addition, for each specific telemetry event, the specific values included in similar models may be also different. For example, for getting an insight about how often users use a popular feature versus not using it, around 2M events may be enough. However, to understand nuances like what a user journey was, whether one color of button is preferred over another based on region, etc., it might need more like 20M+ events to be collected to gain a statistically significant insight. In some embodiments, once generated, the one or more models 204 may be forwarded to the cloud service module 205 for instructing the client devices 103 in telemetry event reporting.

In some embodiments, the generated one or more models 204 may be further dynamically updated. For example, if there are additional telemetry events received by the data collection module 201, the additional telemetry events may provide additional insight, and thus the generated one or more models 204 may be further updated based on the additional telemetry events. For example, when an application is updated or the respective operating system associated with a client device 103n is updated, the relevant telemetry events may be also affected. In addition, there may be certain outliers that may be further detected when additional telemetry events are collected. Therefore, through dynamically updating models 204 for each telemetry event, the statistically significant insight may be continuously monitored and/or updated.

In some embodiments, when generating the models 204, instead of generating the models used for providing the instructions to the client devices, the model generation engine 203 may generate one or more client-version models 204. That is, the generated one or more models 204 may be directly sent back to the client devices 103, to allow the client devices 103 to determine whether a telemetry event should be reported based on the client-version models 204 instead of based on the instructions received from the telemetry event management server 101. By providing client-version models instead of instructions to the client devices 103, the burden on the telemetry event management server 101 may be further released, and the network traffic and additional pings to the server from the client devices 103 will also be reduced, thereby further reducing the processing cost associated with the telemetry event management process. In some embodiments, the client-version models 204 may be also dynamically updated, as described above.

The cloud service module 205 may generate instructions for a client device 103n based on the generated one or more models 204. That is, for a client device 103n, the cloud service module 205 may provide a specific guideline on whether a telemetry event should be collected by the client device 103n. For example, for telemetry event A, the generated instruction for the client device 103n may be "collect A if actions A, B, and C occur in that sequence." In another example, the generated instruction may be "collect A if action A occurs in region A." It is to be noted that these instructions are merely for exemplary purposes, but not for limitation. Many other instructions may be generated by the cloud service module 205 based on the generated one or more models 204. In some embodiments, the generated instructions may be event-specific and/or device-specific. For example, each telemetry event may include different instructions generated for the client devices 103. In addition, for a same telemetry event, the cloud service module 205 may generate different instructions for a different set of devices. For example, for laptops and cell phones, different instructions may be generated for different sets of devices even these instructions are generated for the same telemetry event. In some embodiments, the generated instructions may be also dynamically updated. For example, when the generated one or more models 204 are dynamically updated, the generated instructions may be also dynamically updated. In this way, the statistically significant insight may be continuously monitored and/or updated with a smaller and smaller number of telemetry events collected for each telemetry event.

In some embodiments, after the instructions are generated, the cloud service module 205 may forward the generated instructions to the client devices 103. When the client devices 103 receive the instructions, the client devices 103 may then determine whether or not to report or upload a telemetry event based on the received instructions. The specific process for determining whether or not to report a telemetry event will be described more in detail in FIGS. 3A-3B.

Figure 3A:
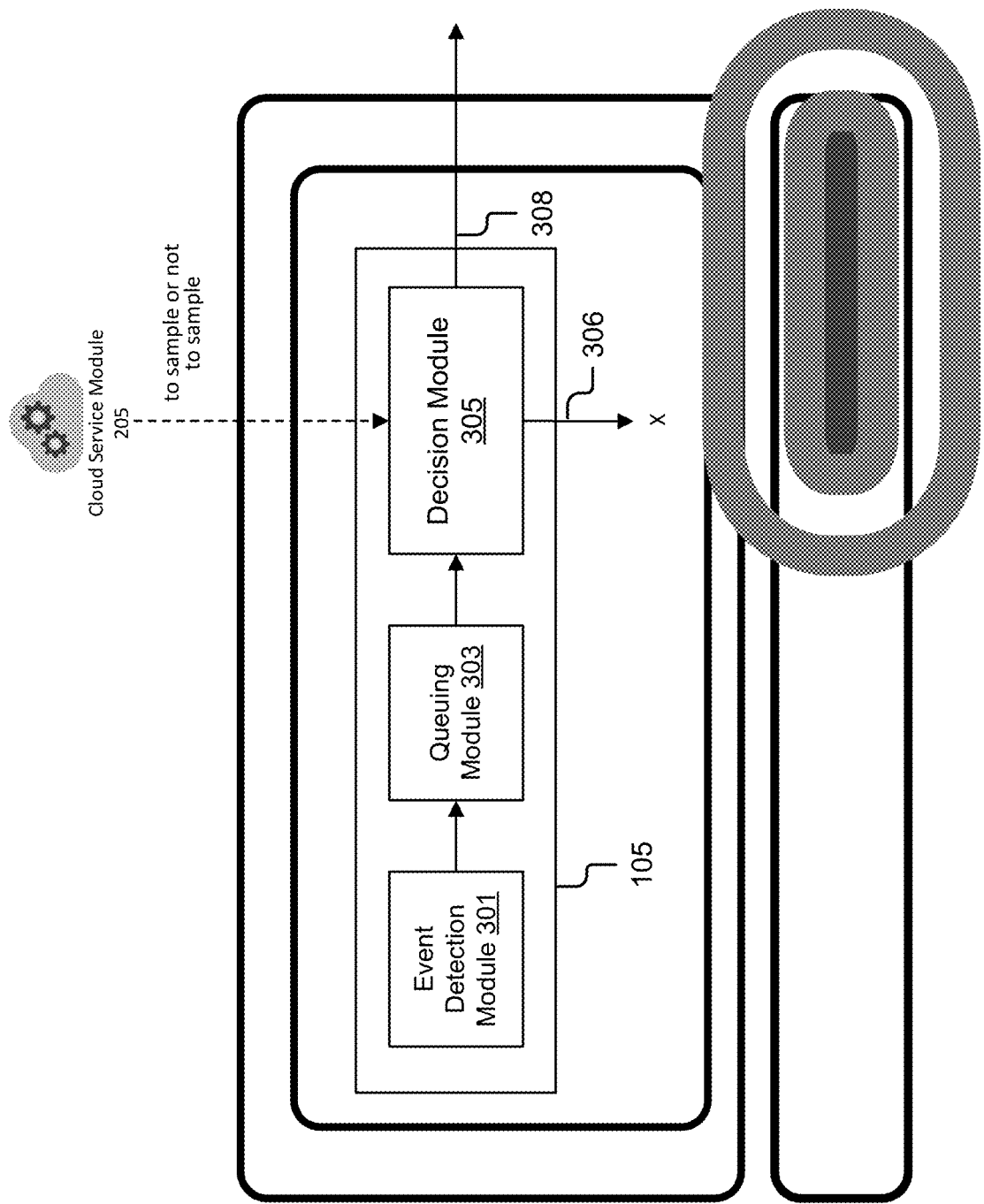
FIG. 3A is a schematic diagram illustrating an example process for determining whether or not to report a telemetry event by a client device.

FIG. 3A is a schematic diagram of an example process for determining whether or not to report a telemetry event by a client device 103n. The example process may be implemented by a telemetry event reporting application 105. To implement the expected functions, the telemetry event reporting application 105 may include an event detection module 301, a queuing module 303, and a decision module 305.

The event detection module 301 may detect a telemetry event emitted from an application at runtime when a particular point of code has been executed. For example, when a file is opened in an application (e.g., Microsoft Word®), a "file open" event may be emitted, letting developers know that a file open was a success. For another example, when a user clicks "button A," a "click button A" event may be emitted, letting developers know that button A has been clicked by a user. As can be seen, there are many different types of telemetry events that may be consistently emitted at runtime when certain actions are taken within an application. The event detection module 301 may continuously detect these telemetry events emitted at different moments. In some embodiments, different applications may emit different telemetry events. Accordingly, on a specific client device 103n, many different telemetry events may be emitted now and then, where these telemetry events may correspond to a same or different application.

In some embodiments, when a telemetry event is collected, certain other information may be also identified for the telemetry event. For example, a telemetry event may have an associated timestamp indicating the exact time that an action corresponding to the telemetry event occurs. For another example, the device information associated with the telemetry event may be also identified. Some other information may be also identified for a detected telemetry event, which may include, but are not limited to, the build of the application associated with the telemetry event, the location information, the device type, the event type, the time taken to complete the action, the associated actions if there are a series of actions that have occurred sequentially, etc. The different information related to a detected telemetry event may be automatically collected upon the telemetry event is detected. In some embodiments, the collected relevant information may be packeted together with the detected telemetry event as a part of metadata associated with the event. When the detected telemetry event is being processed through different components inside the telemetry event reporting application 105, the relevant information may be forwarded simultaneously with the telemetry event. Alternatively, the information may be saved in a specific storage place and can be retrieved on-demand.

As previously described, telemetry events may consistently be emitted from different actions in different applications. Accordingly, there may be different types of telemetry events for a same or different applications. Queuing module 303 may be configured to assign each detected telemetry event to an event-reporting queue queuing at least one of the detected telemetry events on a client device 103n. The term "queuing" may be defined herein as maintaining a data structure that indicates the desired transmission order among events waiting to be sent to a given destination (e.g., to the telemetry event management server 101) and then choosing the events for transmission based on the entries in the data structure.

In some embodiments, queuing module 303 may assign telemetry events to an event-reporting queue based on the associated applications. For example, for each application, there may be an associated queue, and all telemetry events associated with that application may be assigned to that application-specific queue. In some embodiments, queues may be security-based. For example, all queues that contain sensitive data may be assigned to a same queue. In some embodiments, a queue may be priority-based. For example, telemetry events that have a higher priority may be assigned to one queue, and telemetry events that have a lower priority may be assigned to another queue. In some embodiments, the processing time for each queue may be time-limited, and thus there may be some events that need to be drop off without being assigned to a specific queue when there are too many telemetry events that occur at a short period of time. By assigning the telemetry events and processing the telemetry events based on the priority, it increases the probability that the high-priority telemetry events are not dropped off from their respective queue(s). For example, for some telemetry events that wait for a statistically significant insight, these telemetry events may have a higher priority and thus may be assigned to a high-priority queue. For other telemetry events that wait for an updated insight, these telemetry events may have a lower priority and thus may be placed into a low-priority queue.

In some embodiments, when assigning the telemetry events to a specific queue, these telemetry events may be ordered based on the timestamp associated with each telemetry event. Alternatively, these telemetry events may be ordered based on the priority associated with each telemetry event. This may further ensure that the telemetry events with a higher priority be processed without being dropped off when there is a large number of telemetry events waiting for reporting. In some embodiments, once these telemetry events are queued in a specific queue(s), these telemetry events may be then processed sequentially. For example, these telemetry events may be subject to processing by the decision module 305 for determining whether or not to report to the telemetry event management server 101.

Decision module 305 may determine whether or not to report a telemetry event based on the instructions received from the cloud service module 205. Alternatively, the decision module 305 may determine whether or not to report a telemetry event based on the client-version models generated by the model generation engine 203.

In determining whether or not to report a telemetry event based on the instructions, the decision module 305 may check certain data information associated with the telemetry event. For example, if the instruction states that "collect event A if actions A, B, and C occur in that sequence," the decision module 305 may check the information associated with action A, and actions B and C as well. The decision module 305 may check the timestamp associated with the event action A, B, or C, and determine whether to report event A based on the timestamps associated with the actions A, B, and C. If the condition is not met, the telemetry event A may be discarded and not reported to the telemetry event management server 101, as indicated by arrow 306 in FIG. 3A. On the other hand, if the condition is met, the telemetry event A may be forwarded for reporting to the telemetry event management server 101, as indicated by arrow 308 in FIG. 3A. Through the decision process, the telemetry event reporting application 105 may then drop off some telemetry events that need not be reported to the telemetry event management server 101. This may then reduce the processing cost associated with processing the telemetry events. This includes reducing the bandwidth required to transmit the telemetry events from a client device 103n to the telemetry event management server 101. Additionally, the subsequent processing of the telemetry events by the telemetry event management server 101 may be also reduced due to the decreased numbers of telemetry events reported to the server.

In determining whether or not to report a telemetry event based on client-version models generated by the model generation engine 203, the decision module 305 may also check certain data information associated with a telemetry event. As previously described, the model generation engine 203 may reason over a number of events, e.g., by collecting multiple events of "user clicked button A," so as to build a client-version model around the general patterns of data being gotten by that event (e.g., in terms of locales, country, device type, build version, time token to perform the action and other cohort information that is used to build insight, and so on). This client-version model may be then forwarded to the client device 103n. At this point, if an anomaly (with respect to the general patterns of data that contributed to the creation of the "typical" model) is found in the type of telemetry event data detected, it can be prioritized for upload from the client device 103n. Conversely, if it is found that the data match the client-version model and thus is considered as "normal", the telemetry event may be not sent to the telemetry event management server 101. In this way, the insight created by the collection of a telemetry event is conserved while the actual collection of the telemetry events themselves can be minimized or become smaller and smaller.

Figure 3B:
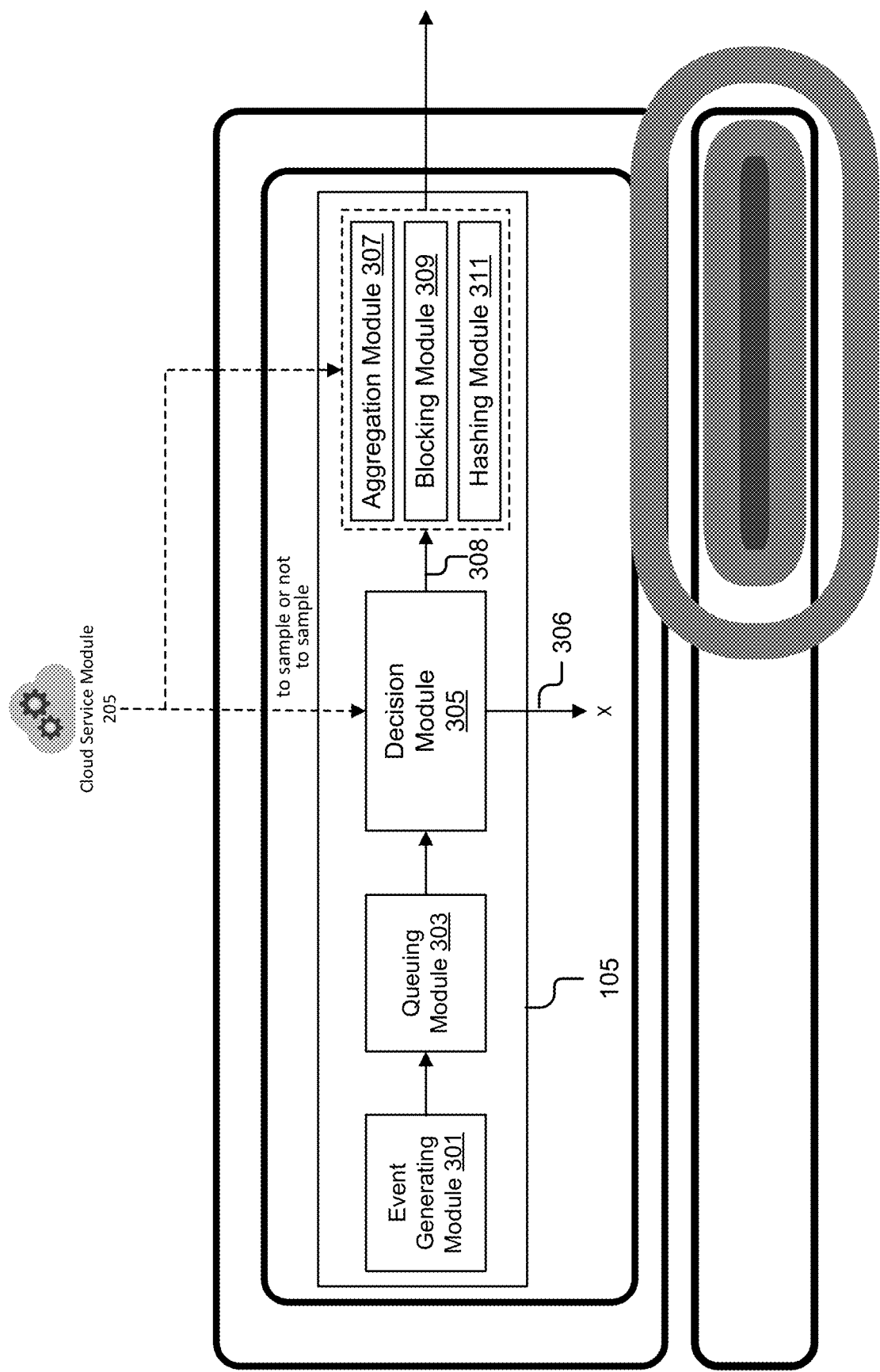
FIG. 3B is a schematic diagram illustrating another example process for determining whether or not to report a telemetry event by a client device.

In some embodiments, when a telemetry event is selected for reporting, before actually uploading the selected telemetry event, the telemetry event reporting application 105 may perform additional processing on the selected telemetry event. The additional processing may include sensitive data processing and/or aggregation of selected telemetry events. Accordingly, as indicated in FIG. 3B, the telemetry event reporting application 105 may optionally include an aggregation module 307 for telemetry events aggregation, a blocking module 309 for turning off telemetry events with sensitive data, and a hashing module 311 for hashing the sensitive data without turning off a whole telemetry event. Although not shown, the telemetry event reporting application 105 may further include a pipeline selection module that selects a pipeline for uploading a telemetry event, as will be described in more detail later.

Aggregation module 307 may aggregate a plurality of same telemetry events to obtain certain insight for the telemetry event before actual forwarding each specific telemetry event. In some embodiments, the statistically significant insight itself is an aggregation, which can be performed locally on a client device 103n instead of collecting and uploading a separate telemetry event for each instance of the activity or action to the telemetry event management server 101. For example, the number of times that a user(s) clicks button A may be aggregated and intermittently (e.g., an event/insight per day/week) sent to the telemetry event management server 101 as a single event. By aggregating the event data on a client-side, the amount of event data that needs to be uploaded to the data collection module 201 may be further reduced, thereby further reducing the event volume to be processed by the telemetry event management system 100 while providing the same insight.

In some embodiments, the aggregation module 307 may search the telemetry events in one or more queues generated by the queuing module 303, to determine whether a number of same telemetry events exist. If there is a number of same telemetry events that exist in the queues, these same telemetry events may be removed from the queues and be placed in a special aggregation queue instead or may be stored in a storage place marked for aggregation. In some embodiments, the aggregation module 307 may further generate a signature for each telemetry event, and thus search the same telemetry events by searching the signature associated with each telemetry event. In some embodiments, the aggregation for the same telemetry events may be performed until at least one telemetry event is selected for uploading by the decision module 305. If one telemetry event is selected for discard by the decision module 305, the telemetry events with a same signature may be simultaneously discarded without being processed by the decision module 305. This additionally reduces the time and processing cost associated with processing the telemetry events. It is to be noted that, in some embodiments, the aggregation may be performed before queuing the telemetry events by the queuing module 303, or before deciding whether the telemetry event is selected for uploading or discard by the decision module 305.

As described earlier, in some embodiments, a privacy vulnerability may be detected due to a bug and thus a telemetry event may contain unexpected sensitive data. Assuming that a telemetry event data contains five fields: A, B, C, D, and E. If one field contains a general event, such as the time to boot an application, which is a number expected to collect. However, somehow there is a bug and thus a user's name, user's email address, or the other sensitive data is collected instead of the number indicating the time to boot the app being collected. That is, a field that is supposed to collect one type of data is collecting unexpected sensitive data, which is problematic in privacy protection. The disclosed telemetry event reporting application 105 may mitigate the problem in a number of different ways.

One way of mitigation is to remotely turn off the related telemetry event when such sensitive data is detected. For example, once a telemetry event containing the sensitive data is uploaded to the telemetry event management server 101 and is detected therein, the responsible developer may be notified of the problematic field or column and the corresponding telemetry event. A dynamic process may be executed to ping the corresponding client device 103n not to forward the detected problematic telemetry event. The client device 103n may then essentially block the same problematic telemetry event from being released/uploaded. The blocking module 309 may block the problematic telemetry event by not uploading a same incoming telemetry event to the telemetry event management server 101.

Another way of mitigation is to replace the problematic field or column with a hash value. If turning off or blocking the telemetry event as above-described, some valuable information may be lost. For example, out of the five fields in the aforementioned telemetry event, only one of the fields is problematic. By turning off the whole telemetry event, information in all five fields will not be reported, which may then cause a data quality problem because some important information may be not reported. Therefore, instead of turning off or blocking the whole telemetry event from being uploaded, the telemetry event management server 101 may implement a dynamic process to inform the client device 103n the problematic field or column, so that the problematic field or column may be hashed on the client-side with a hash value using a hashing function. In some embodiments, the hashing function used herein may also add an in-boundary salt to the hashed value, which is an extra value added to the already hashed value. This may prevent the sensitive data from being reversed out of the telemetry data, thereby protecting a user's privacy. Under certain circumstances, the sensitive data may be still inferred from the hash value by brute-force checking. Therefore, an additional layer of protection may be further implemented by additionally applying a hashing function on the server-side in addition to the aforementioned client side, so that a double-blind approach is employed to hash the sensitive data twice. This may make sure that even one of the hash values is reversed, there is still another hash value for privacy protection. The hashing module 311 illustrated in FIG. 3B may be employed to implement the above-described hashing functions on the client side. It is to be noted while only hashing module 311 on the client device is illustrated in FIG. 3B, an additionally hashing module (not shown in the figures) may be also located on the server-side.

A third way of mitigation is to upload a telemetry event containing sensitive data through a different pipeline (not shown), which may be a pipeline that has higher-level security or may be a specialized pipeline that is specifically designed for uploading the sensitive data. Therefore, instead of discarding the telemetry event containing the sensitive data, the telemetry event may be dynamically redirected to such a pipeline if any vulnerabilities or risks are detected. This mitigation strategy may facilitate obtaining the insight while also allowing the obligations to customers around their privacy to be met. In some embodiments, there may be additional mitigation strategies possible, which are also contemplated by the present disclosure.

It is to be noted that while the above-described different modules or functions are described in view of the flows indicated by the arrows in FIGS. 3A-3B, the actual processing of each described function may be not necessarily in the order as indicated by the arrows in the figures. For example, the sensitive data mitigation may be processed at the very beginning of a telemetry event detection if privacy is one of the major concerns for an application. In whatever the order, once an event (a telemetry event or an aggregated event/insight) is selected for reporting, the event may be uploaded to the telemetry event management server 101 for model generation/update and for obtaining the insight for the associated telemetry event, as described earlier in FIG. 2.

As previously described, whenever a client device 103*n* generates the telemetry data and sends the data over the network 109 to the telemetry event management server 101, there is always some type of processing cost occurring on the client-side in sending the data. Through the above-described dynamic sampling process, the telemetry events are turned off not just due to the privacy reason, but also due to the processing cost across the system including all the client devices 103 involved as well as the backend telemetry event management server 101. For example, if fewer telemetry events are reported, the telemetry event management server 101 may have fewer data to consume, process, and analyze, and thus the infrastructure involved in managing the telemetry events can have less burden in managing the tremendous volume of telemetry events. In addition, through the above-described mitigation strategies, the privacy vulnerability may be addressed so that the obligations to customer privacy can be met without necessarily discarding the data. Therefore, the disclosed technical solutions may advance the telemetry event management processes by addressing the technical problems experienced by other existing telemetry event management systems. The benefits and advantages of the disclosed solutions may be further demonstrated through an example telemetry event management method described in FIG. 4.

Figure 4:
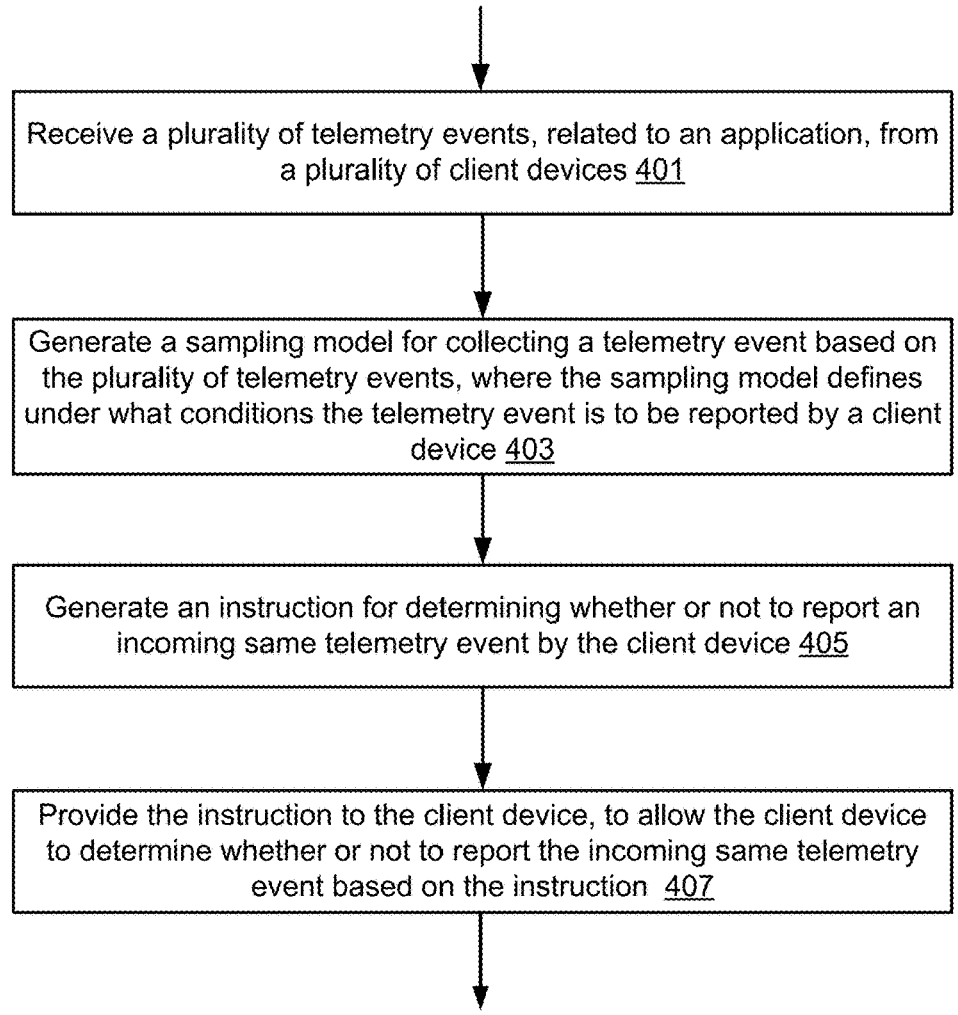
FIG. 4 is a flow chart illustrating an example method for managing telemetry event reporting.

FIG. 4 is a flow chart of an example method 400 for managing telemetry event reporting. In step 401, a cloud-based server (e.g., a telemetry event management server 101) may receive a plurality of telemetry events, related to an application (e.g., a Microsoft Word®), from a plurality of client devices (e.g., client devices 103*a*-103*n*). The plurality of events may include a number of same telemetry events collected from a same or different client device. The plurality of telemetry events may be collected at the very beginning stage when the could-based sever communicates with the plurality of client devices, or at any other stage. A number of collected same telemetry events may be aggregated for identifying an insight from one or more actions associated with the same telemetry event.

In step 403, the cloud-based server may generate a sampling model based on the plurality of telemetry events, where the sampling model defines under what conditions an incoming same telemetry event is to be reported by a client device (e.g., a client device 103*n*). The sampling model may be generated based on the number of same telemetry events received by the cloud-based server as described above. For example, the number of same telemetry events may be aggregated to determine whether a statistically significant insight is obtained. If the statistically significant insight is already obtained, no additional same telemetry event needs to be collected or reported, and thus a generated model may indicate no collection of additional same telemetry events. However, if the data aggregation indicates that there is no statistically significant insight obtained from the collected telemetry events, the generated sampling model may define under what conditions a client device may report an incoming same telemetry event.

In step 405, the cloud-based server may generate an instruction for determining whether or not to report an incoming same telemetry event by the client device. For example, based on the generated model, the cloud-based server may generate a specific instruction to instruct whether or not to report an incoming same telemetry event by a client device. The specific instruction may include a programming language or other types of command to direct a client device to check whether the conditions are met in determining whether to report an incoming same telemetry event.

In step 407, the cloud-based server may forward the instruction to the client device, to allow the client device to determine whether or not to report an incoming same telemetry event based on the instruction. For example, if the instruction directs a client device not to collect the same telemetry event anymore, the client device may directly discard an incoming same telemetry event. If the instruction instructs the client device to check whether the conditions are met in collecting an incoming same telemetry event, the client device may then check whether the conditions are met. If the conditions are not met by the client device, the client device may still not collect an incoming same telemetry event. At this point, another client device may also receive the instruction, and the conditions included in the instruction may be met by this another client device. Accordingly, this another client device may report an incoming same telemetry event to the cloud-based server. In this way, a proper telemetry event may be then reported by a respective client device.

As can be seen, through the above-described process, only telemetry events that meet certain conditions are reported by the respective client devices, where these telemetry events meeting the conditions may provide information to obtain the statistically significant insight for the action(s) associated with the associated telemetry event. Telemetry events that do not provide information for the insight may not be reported by the respective client device(s). Accordingly, the processing cost associated with telemetry event management may be greatly reduced. Although not specifically described in method 400, the disclosed technical solution may also mitigate the privacy vulnerability through different strategies as previously described. Therefore, the disclosed methods and systems may greatly advance the existing telemetry event management systems.

Figure 5:
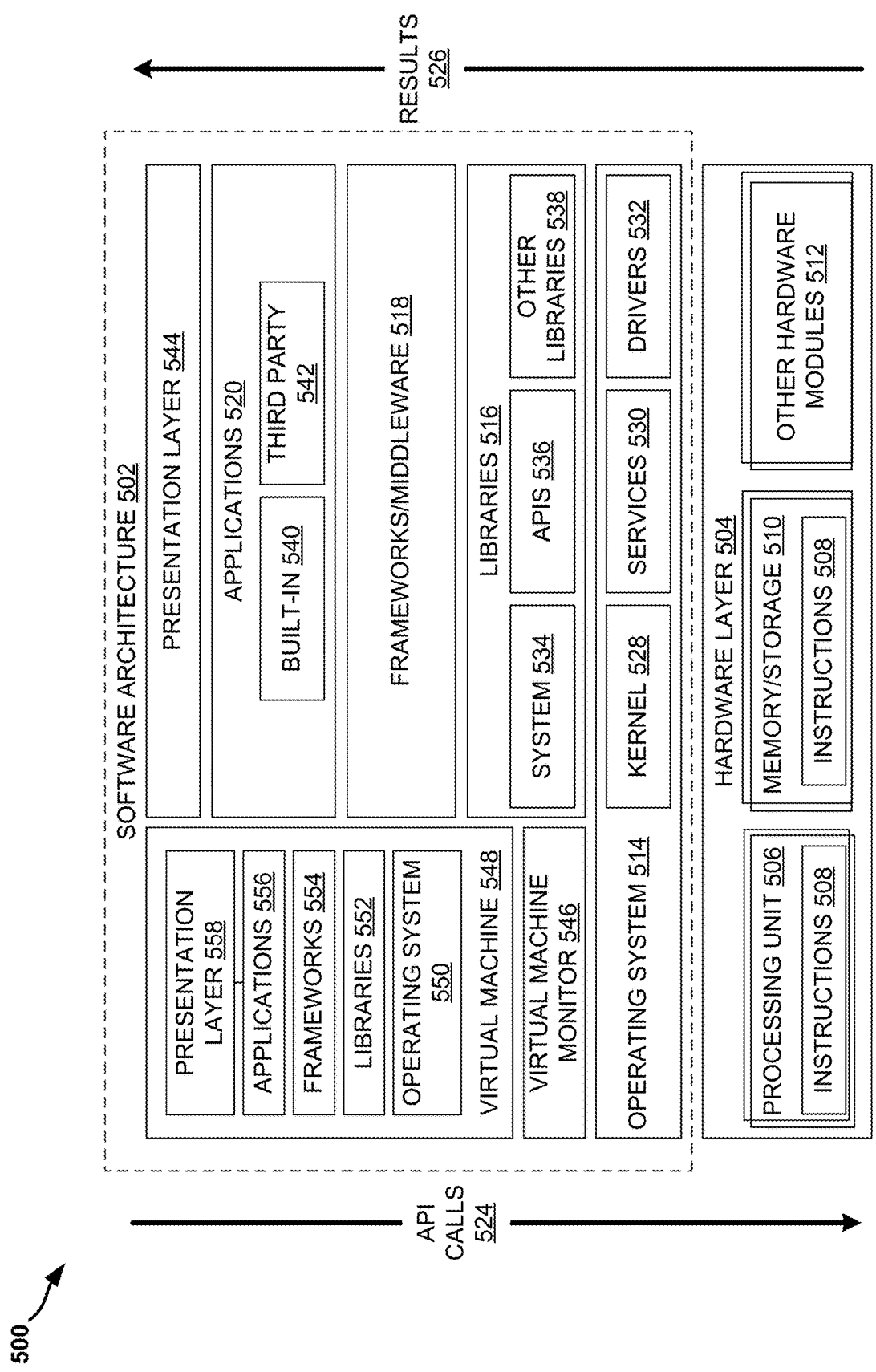
FIG. 5 is a block diagram illustrating an example software architecture.

FIG. 5 is a block diagram 500 illustrating an example software architecture 502, various portions of which may be used in conjunction with various hardware architectures herein described, which may implement any of the above-described features. FIG. 5 is a non-limiting example of software architecture, and it will be appreciated that many other architectures may be implemented to facilitate the functionality described herein. The software architecture 502 may execute on hardware such as a machine 600 of FIG. 6 that includes, among other things, processors 610, memory 630, and input/output (I/O) components 680. A representative hardware layer 504 is illustrated and can represent, for example, the machine 600 of FIG. 6. The representative hardware layer 504 includes a processing unit 506 and associated executable instructions 508. The executable instructions 508 represent executable instructions of the software architecture 502, including implementation of the methods, modules, and so forth described herein. The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For example, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular platform. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
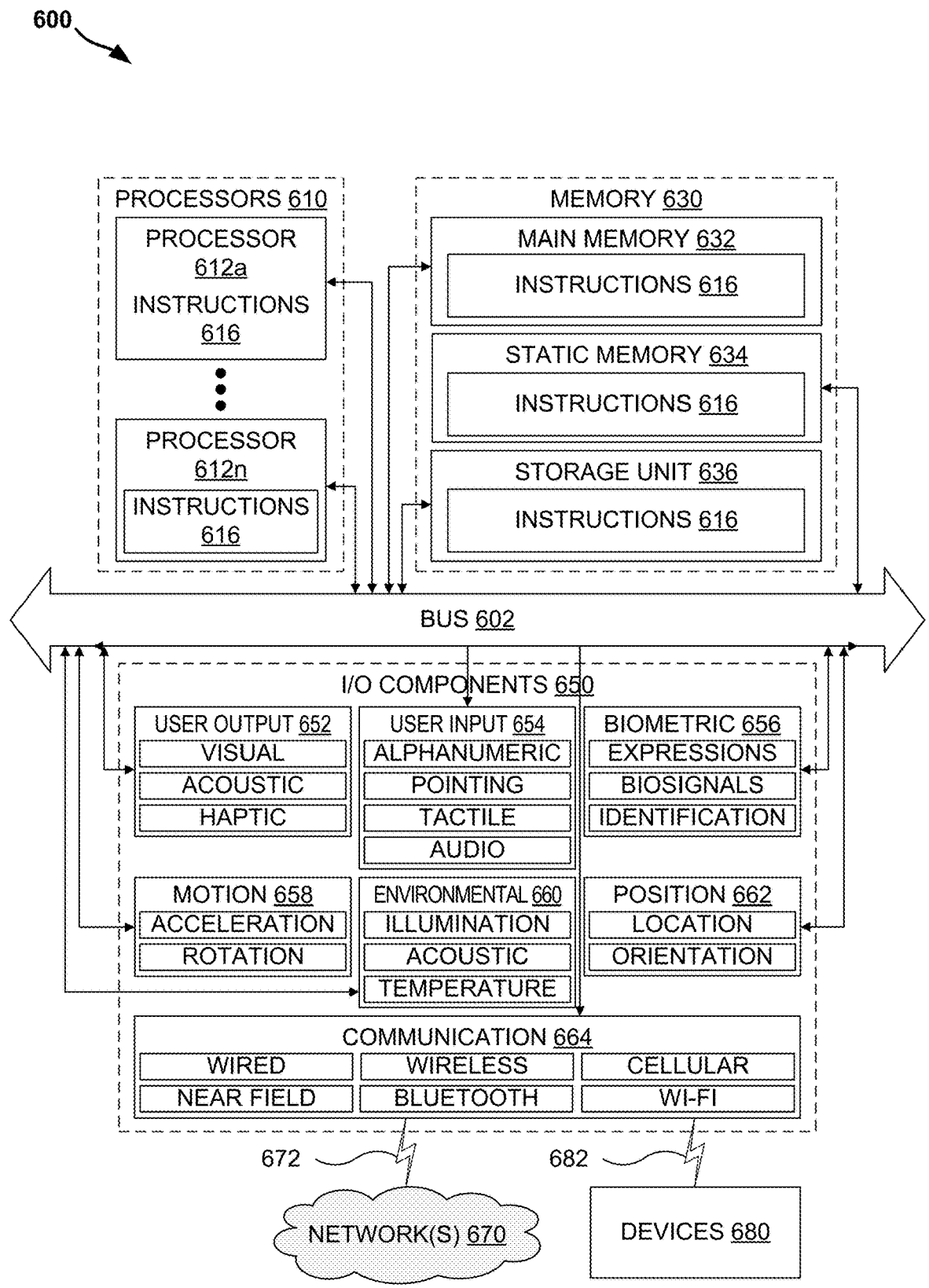
FIG. 6 is a block diagram illustrating components of an example machine configured to read instructions from a machine-readable medium.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement modules or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660, and/or position components 662, among a wide array of other physical sensor components. The biometric components 656 may include, for example, components to detect body expressions (for example, facial expressions, vocal expressions, hand or body gestures, or eye tracking), measure bio-signals (for example, heart rate or brain waves), and identify a person (for example, via voice-, retina-, fingerprint-, and/or facial-based identification). The motion components 658 may include, for example, acceleration sensors (for example, an accelerometer) and rotation sensors (for example, a gyroscope). The environmental components 660 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 106, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for sampling telemetry events, comprising:
a processor; and
a memory, coupled to the processor, configured to store executable instructions, wherein the instructions, when executed by the processor, cause the processor to:
receive a plurality of telemetry events, related to an application, from a plurality of client devices;
generate a sampling model for collecting a telemetry event based on the plurality of telemetry events, wherein the sampling model defines under what conditions the telemetry event is to be reported by a client device;
generate an instruction for determining whether to report an incoming same telemetry event by the client device based on the sampling model; and
provide the instruction to the client device, to allow the client device to determine whether to report the incoming same telemetry event based on the instruction.

2. The system of claim 1, wherein, to generate the sampling model and the instruction, the instructions further cause the processor to:
determine whether a statistically significant insight is obtained for the telemetry event based on the plurality of telemetry events;
if the statistically significant insight is obtained for the telemetry event, generate a corresponding instruction to instruct the client device to discard new instances of the incoming same telemetry event.

3. The system of claim 1, wherein, to generate the sampling model and the corresponding instruction, the instructions further cause the processor to:
determine whether a statistically significant insight is obtained for the telemetry event based on one or more insights received from one or more of the plurality of client devices;
if the statistically significant insight is obtained for the telemetry event, generate a corresponding instruction to instruct the client device to discard the incoming same telemetry event.

4. The system of claim 1, wherein, to generate the sampling model for collecting the telemetry event based on the plurality of telemetry events, the instructions further cause the processor to:
dynamically update the generated sampling model based on additional telemetry events reported by the plurality of client devices.

5. The system of claim 4, wherein:
to generate the sampling model, the instructions further cause the processor to generate a client-version model for the plurality of client devices; and
to generate and provide the instruction to the client device, the instructions further cause the processor to provide the client-version model to the client device, to allow the client device to determine whether to report the incoming same telemetry event based on the client-version model.

6. The system of claim 1, wherein the instructions further cause the processor to:

determine that one of the plurality of telemetry events logs sensitive data; and ping a client device that has reported the one of the plurality of telemetry events not to collect a same telemetry event that logs the sensitive data.

7. The system of claim 1, wherein the instructions further cause the processor to:

determine that one of the plurality of telemetry events logs sensitive data; and ping a client device that has reported the one of the plurality of telemetry events to hash a field that logs the sensitive data before reporting a same telemetry event that logs the sensitive data.

8. The system of claim 1, wherein the instructions further cause the processor to:

determine that one of the plurality of telemetry events logs sensitive data; and ping a client device that has reported the one of the plurality of telemetry events to report a same telemetry event that logs the sensitive data through a pipeline that has a higher-level security.

9. A method for sampling telemetry events, comprising:

receiving, by a cloud-based server, a plurality of telemetry events, related to an application, from a plurality of client devices;

generating, by the cloud-based server, a sampling model for collecting a telemetry event based on the plurality of telemetry events, wherein the sampling model defines under what conditions the telemetry event is to be reported by a client device;

generating, by the cloud-based server, an instruction for determining whether to report an incoming same telemetry event by the client device based on the sampling model; and providing, by the cloud-based server, the instruction to the client device, to allow the client device to determine whether to report the incoming same telemetry event based on the instruction.

10. The method of claim 9, wherein generating the sampling model and the instruction comprises:

determining, by the cloud-based server, whether a statistically significant insight is obtained for the telemetry event based on the plurality of telemetry events;

if the statistically significant insight is obtained for the telemetry event, generating a corresponding instruction to instruct the client device to discard new instances of the incoming same telemetry event without reporting the incoming same telemetry event to the cloud-based server.

11. The method of claim 9, wherein generating the sampling model and the instruction comprises:

determining, by the cloud-based server, whether a statistically significant insight is obtained for the telemetry event based on one or more insights received from one or more of the plurality of client devices;

if the statistically significant insight is obtained for the telemetry event, generating a corresponding instruction to instruct the client device to discard the incoming same telemetry event without reporting the incoming same telemetry event to the cloud-based server.

12. The method of claim 11, wherein each of the one or more insights is obtained by a corresponding client device through aggregating a plurality of same telemetry events that occurred on the corresponding client device.

13. The method of claim 9, wherein generating the sampling model for collecting the telemetry event based on the plurality of telemetry events further comprises dynamically updating the generated sampling model based on additional telemetry events received by the cloud-based server.

14. The method of claim 9, wherein generating the sampling model further comprises generating a client-version model for the plurality of client devices; and generating and providing the instruction to the client device further comprises providing the client-version model to the client device, to allow the client device to determine whether to report the incoming same telemetry event based on the client-version model.

15. The method of claim 14, wherein the client-version model is generated based on patterns of data associated with the telemetry event.

16. The method of claim 15, wherein the patterns of data correspond to one or more of a locale, country, device type, build version, and time taken to perform an action associated with the telemetry event.

17. The method of claim 9, further comprising:

determining, by the cloud-based server, that one of the plurality of telemetry events logs sensitive data; and pinging a client device that has reported the one of the plurality of telemetry events not to collect a same telemetry event that logs the sensitive data.

18. The method of claim 9, further comprising:

determining, by the cloud-based server, that one of the plurality of telemetry events logs sensitive data; and pinging a client device that has reported the one of the plurality of telemetry events to hash a field that logs the sensitive data before reporting a same telemetry event that logs the sensitive data.

19. The method of claim 18, wherein the field that logs the sensitive data is hashed using a salt that is only available in a client boundary.

20. The method of claim 19, further comprising:

determining, by the cloud-based server, that one of the plurality of telemetry events logs sensitive data; and pinging a client device that has reported the one of the plurality of telemetry events to report a same telemetry event that logs the sensitive data through a pipeline that has a higher-level security.

\* \* \* \* \*